(12) United States Patent
Beerwerth et al.

(10) Patent No.: US 7,618,738 B2
(45) Date of Patent: Nov. 17, 2009

(54) AIR MANAGEMENT SYSTEM FOR ZINC-AIR BATTERY

(75) Inventors: Frank Beerwerth, Runkel-Ennerich (DE); Christian Neyer, Eschborn (DE)

(73) Assignee: The Gillette Company, Boston, MA (US)

( * ) Notice: Subject to any disclaimer, the term of this patent is extended or adjusted under 35 U.S.C. 154(b) by 176 days.

(21) Appl. No.: 11/043,436

(22) Filed: Jan. 25, 2005

(65) Prior Publication Data

US 2006/0166079 A1   Jul. 27, 2006

(51) Int. Cl.
*H01M 2/12* (2006.01)
(52) U.S. Cl. .............................. 429/71; 429/82; 429/88; 429/83; 429/153
(58) Field of Classification Search .................. 429/133, 429/88, 229, 153, 163, 82, 83, 71
See application file for complete search history.

(56) References Cited

U.S. PATENT DOCUMENTS

2004/0048146 A1*  3/2004  Adamson et al. .............. 429/83

OTHER PUBLICATIONS

Article on "Synchronous Motors." [online]. Integrated Publishing, EE Training Series, Sep. 20, 2003 (Web Publication Date). [retrieved on Jan. 4, 2006]. Retrieved from internet: http://web.archive.org/web/20030920162334/http://www.tpub.com/content/neets/14177/css/14177_92.htm >.*

* cited by examiner

*Primary Examiner*—Patrick Ryan
*Assistant Examiner*—Ben Lewis
(74) *Attorney, Agent, or Firm*—Fish & Richardson P.C.

(57) ABSTRACT

A metal-air battery is shown. The metal-air battery includes a housing holding at least one metal-air cell and an interface electrically coupled to the housing holding the at least one metal-air cell. The interface includes an air management system. The air management system includes a housing having at least one cavity and a passage to allow air flow from the cavity. The housing carries contacts to make electrical contact with the interface. A motor is disposed within the one cavity and an impeller is in communication with the motor. An electronic circuit is provided to control the motor and a cover disposed over one side of the housing. The metal-air battery can be a zinc-air battery.

32 Claims, 7 Drawing Sheets

AIR MANAGEMENT SYSTEM FOR ZINC-AIR BATTERY

BACKGROUND

Different types of primary batteries are available. The most common types of primary batteries are Zn-carbon, alkali-manganese, and Li batteries. A special purposes type of cell is the metal-air cell of which the Zn-Air cell is the most common. Zn-Air button cells are commonly used for hearing aid applications. Another application for high power Zn-Air batteries is as a source of energy for emergency power supplies. Zinc-air cells have a very high energy density, e.g., up to 40% higher than the energy density of the most advanced Li-batteries. The high energy density results because the material for one electrode is inside the battery housing, which leads to the increased capacity for that material. The material for the second electrode is oxygen from ambient air.

While generating electric current the battery needs to receive continuously fresh air proportional to electrical power provided by the battery. Small button cells receive air by diffusion. For high power applications, the battery includes a fan or other mechanism to push air through the battery.

A major drawback for Zn-Air cells is that as soon as the cells come into contact with air, the cells start aging, even without delivering electrical power. This happens for two reasons. One reason is that the electrolyte, which is typically potash lye, is neutralized by carbon dioxide in the air. The second is that the cell dries out due to air exchange inside the battery.

SUMMARY

According to an aspect of the invention, an air management system for a metal-air battery includes a housing having at least one cavity with the housing providing electrical contact to metal-air cells and a passageway to couple air flowing in the cavity of the housing to metal-air cells. The air management system also includes a motor disposed in the at least one cavity, a impeller, such as a radial impeller, a mixed mode impeller or a diagonal impeller, in communication with the motor and configured to deliver air to the exit port of the housing, and a cover disposed over the housing.

The following embodiments are within the scope of the invention. The housing includes two disk shaped members that couple to a metal-air cell. The housing includes two disk shaped members configured to couple to a pair of keyholes on a carrier that is coupled to a metal-air cells. The housing has a channel to provide air passage from the cavity and through the housing. The impeller assembly includes an impeller cover and a lamella wheel. The system is configured to have two battery cells and the impeller axis is identical with the axis of one of a pair of battery cells. The cover includes a pair of contacts to make electrical connection with an appliance. The motor is a synchronous motor and the system further includes a electronic circuit to control operation of the synchronous motor, the electronic circuit including a sensor circuit that senses a voltage across a resistor, and amplifies the voltage to provide an input signal for the electronic circuit. The electronic circuit includes a voltage controlled oscillator that produces an output signal to drive the synchronous motor in response to the input signal from the sensor circuit. The electronic control circuit includes a driver circuit to apply pulses to drive the synchronous motor. The electronic circuit includes a circuit to start the synchronous motor. The electronic circuit includes a generator circuit to produce output pulse signals with a first one of the output pulse signals having a long duration to adjust the rotor of the motor in one of two possible orientations. After the first pulse is produced, the driver delays a period of time to give the rotor time to finish any oscillations and to settle in position, and subsequently the driver starts a sequence for accelerating and constantly turning the motor.

According to an aspect of the invention, a metal-air battery includes a housing holding at least one metal-air cell, an interface electrically coupled to the housing holding the at least one metal-air cell and an air management system. The air management system includes a housing having at least one cavity and a passage to allow air flow from the cavity and carrying contacts to make electrical contact with the interface, a motor disposed within the one cavity, an impeller, such as a radial impeller, a mixed mode impeller or a diagonal impeller, in communication with the motor, an electronic circuit to control the motor, and a cover disposed over one side of the housing.

The following embodiments are within the scope of the invention. The housing having at least one cavity includes two disk shaped members that couple to the interface. The housing having at least one cavity includes two disk shaped members configured to couple to a pair of keyholes on the interface. The housing has a channel to provide air passage from the cavity and through the housing. The impeller assembly includes an impeller cover and a lamella wheel. The battery is configured to have two battery cells and the impeller axis is identical with the axis of one of a pair of battery cells. The cover includes a pair of contacts to make electrical connection with an appliance. The motor is a synchronous motor and the system further includes a electronic circuit to control operation of the synchronous motor, the electronic circuit including a sensor circuit that senses a voltage across a resistor, and amplifies the voltage to provide an input signal for the electronic circuit. The electronic circuit includes a voltage controlled oscillator that produces an output signal to drive the synchronous motor in response to the input signal from the sensor circuit. The electronic control circuit includes a driver circuit to apply pulses to drive the synchronous motor. The electronic circuit includes a circuit to start the synchronous motor. The electronic circuit includes a generator circuit to produce output pulse signals with a first one of the output pulse signals having a long duration to adjust the rotor of the motor in one of two possible orientations. After the first pulse is produced, the driver delays a period of time to give the rotor time to finish any oscillations and to settle in position, and subsequently the driver starts a sequence for accelerating and constantly turning the motor. The at least one metal-air cell is a zinc-air cell. The at least one metal-air cell is a first one of a pair of zinc-air cells. The housing of the air management system has the at least one cavity as a first cavity and has a second cavity and the passage to allow air flow is disposed between the first and second cavities. The motor is disposed in one of the cavities in the housing of the air management system and the other cavity holds the electronic circuit to control the motor.

According to an additional aspect of the present invention, an interface for an air management system and metal-air battery includes a carrier having a pair of keyholes and a hole disposed through the carrier, and an tube coupled to the hole in the carrier.

The following embodiments are within the scope of the invention. An O-ring is disposed in an opening on a front surface of the interface to secure an air seal with the tube and the air management system. The interface includes a pair of contact springs with one spring disposed in a corresponding one of the keyholes.

According to an additional aspect of the present invention a method of operating an metal-air battery includes providing a battery having housing holding at least one metal-air cell and an interface electrically coupled to the at least one metal-air cell and attaching an air management system to the battery by engaging contacts on the housing with the interface.

The following embodiments are within the scope of the claims. The method engages the contacts to a pair of keyholes on the interface to the contacts against contact springs in keyholes in the interface.

One or more aspects of the invention may provide one or more of the following advantages. The arrangements can provide a load dependent air supply for a small battery configurations such as 2-AA, a single AA, smaller or larger battery sized cells. The air management configuration is removable and reusable with other battery cells. Thus, the air management configuration can be built into appliances that are configured to accept such battery devices, or can be an article that a user attaches to zinc-air cells prior to inserting into an appliance. The air management configuration uses a relatively large diameter impeller, resulting in moderate required motor speed. The impeller is placed in a manner so that the impeller can have the largest diameter possible in a given housing. The motor is a synchronous brushless motor that is simply in construction and has low-levels of electromagnetic emissions. Electronic control for operating the motor and sensing the battery current is provided. The control senses the rotor position without the need of a sensor but rather by sensing the induced voltage. Because of the use of a simple motor and relatively few components low cost manufacturing is possible.

DETAILED DESCRIPTION

Figure 1A:
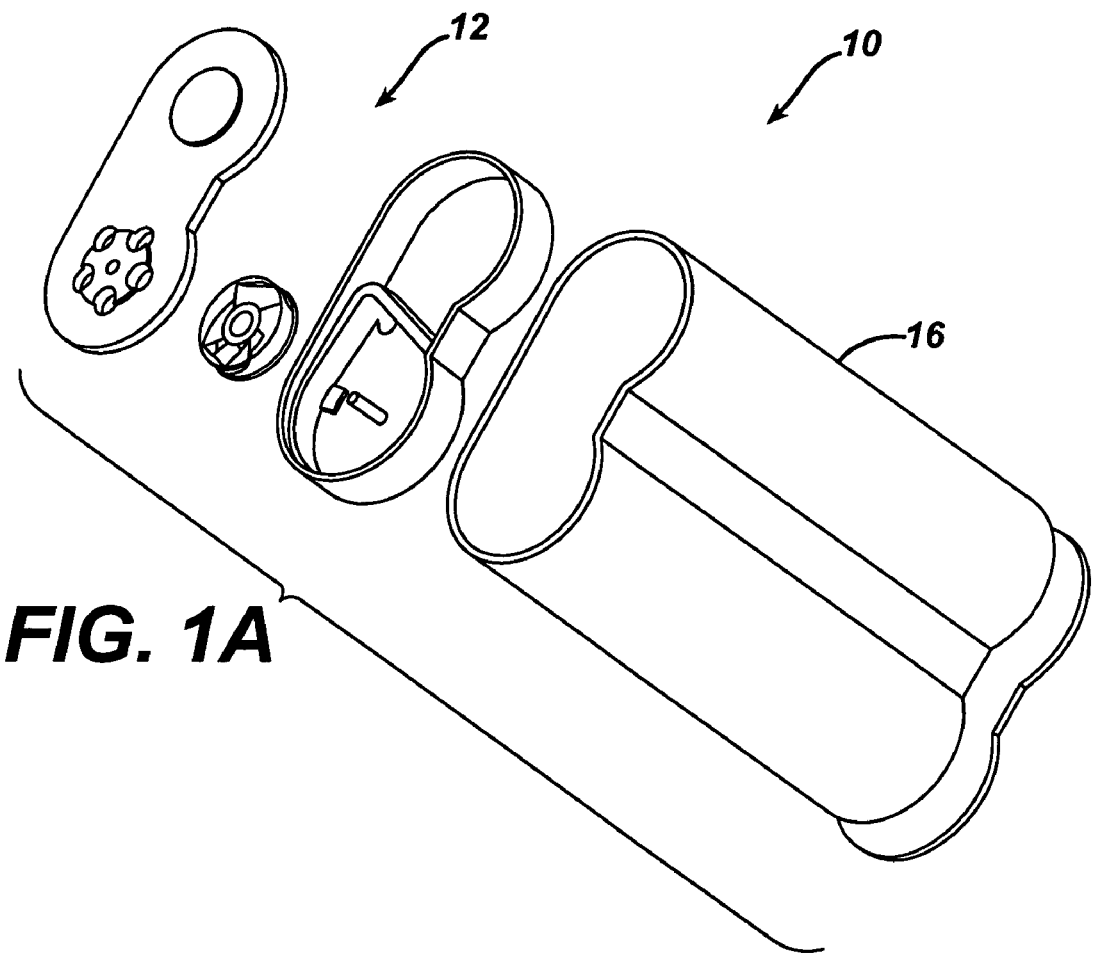
FIG. 1A is an exploded, perspective view of an air management system coupled to a zinc-air battery system.
Figure 1B:
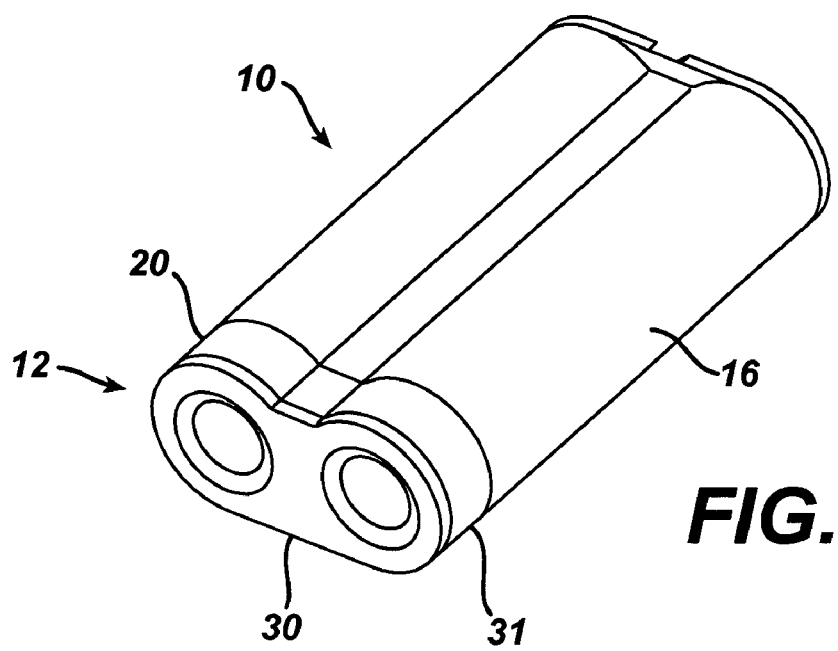
FIG. 1B is a perspective view of the air management system coupled to the zinc-air battery system.

Referring to FIGS. 1A and 1B, a metal-air cell such as a zinc-air battery system 10 (depicted diagrammatically) is shown. The zinc-air battery system 10 includes an air management system 12. As illustrated, the air management system 12 is particularly adapted for 2-AA sized battery cells, but other configurations are possible using the air management system 12 configured accordingly. The air management system 12 is reusable and attaches to a housing 16 of the zinc air battery system 10. The housing 16 is adapted to be re-used and is refillable with Zinc-Air cells (not shown).

As shown in FIG. 1B, the housing 16 is sealed and easy replaced on the air management system 12. The system includes a carrier 31 that acts as a mechanical, fluid and electrical interface between a housing 20 and cover 30 of the air management system 12 and the housing 16 of the battery.

Figure 2A:
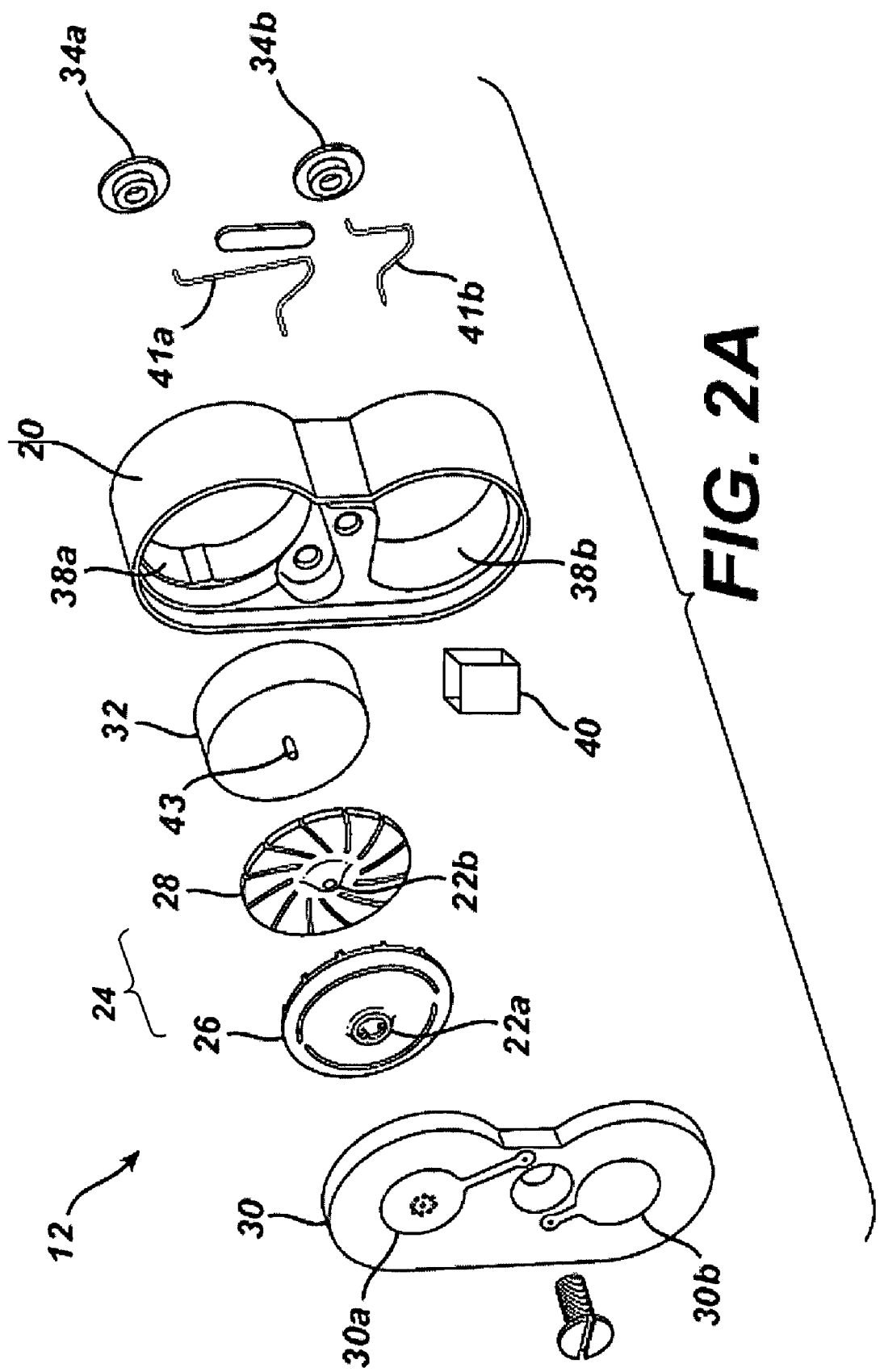
FIG. 2A is an exploded, perspective diagram of the air management system.

Referring to FIG. 2A, the air management system 12 is shown. In this example, the air management system 12 includes the housing 20, two bushings 22a, 22b, a radial impeller 24 and a motor 32. Other configurations of impellers could be used such as a diagonal or mixed mode impellers. While some versions can include the bushings, other versions can include a toe bearing, provided by a peaked motor axis and a plate, similar to the bearing of a compass needle. Also included in the air management system is a cover 30 having battery contacts 30a, 30b. The cover 30 is made similar to a printed circuit board. The contacts 30a, 30b on the cover 30 are provided by, e.g., plating (copper or other techniques and materials), regions onto an outer surface of the cover 30. The housing receives other components of the air management system 12, to route air to the Zinc-Air cells. Wires, cables or conductors (not shown) are disposed in the housing 20 to make contact between the contacts 30a, 30b and the cells. The housing 20 carries two disk shaped members 34a, 34b on the backside of the housing. The disk shaped members 34a, 34b couple to the zinc-air battery cells via a carrier 31 (FIG. 2B).

The housing 20 includes a cavity 38a for housing the motor 32 and a cavity 38b for housing electronic circuits 40 to control the motor 32. The cavities 38a, 38b are generally rounded, smooth disked shaped recesses in one side of the housing 20. A channel 39 is provided between the cavities 38a and 38b to allow air flow generated by the motor 32 and impeller in the motor cavity to reach a first diffusion tube 41a (FIG. 2A) and deliver air into the zinc-air cells. That is, air enters through the entry holes in the cover 30 and travels to the entry hole in the middle of the impeller. From the middle of the impeller the air moves to the circumference of the impeller and along the inner circumference of the cavity 38a, in the channel 39 and exits at the air exit port (FIG. 2B) reaching the first diffusion tube 41a of the battery pack. The air travels through the battery pack and through a second diffusion tube 41b on the far side of the battery pack.

The diffusion tubes 41a and 41b and the channel 39 as well as other interior regions of the housing 20 should be as smooth as possible to minimize air flow constrictions. Ideally, the inlet and the outlet of the diffusion tubes 41a, 41b should have chamfered ends.

Figure 2B:
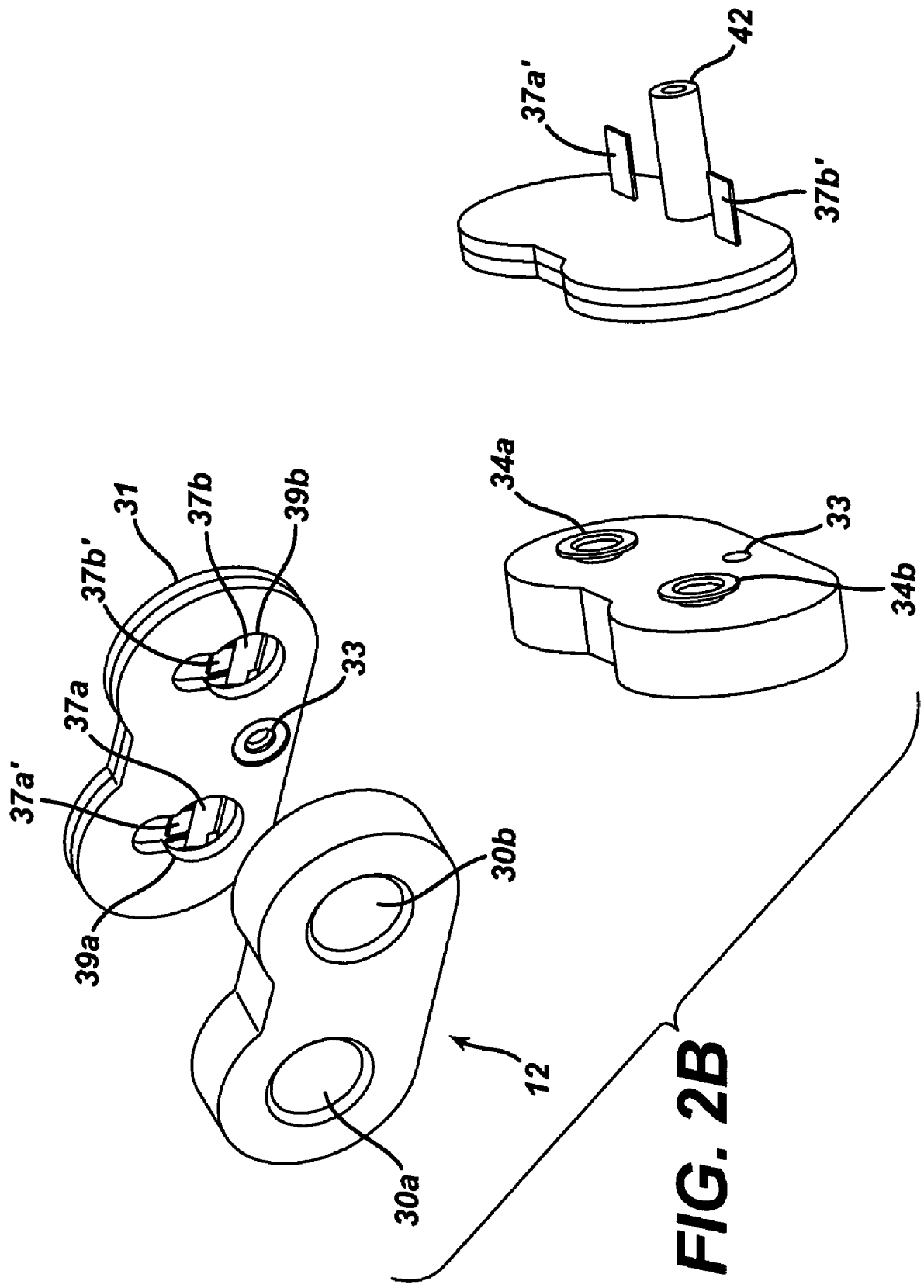
FIG. 2B is a perspective view showing features of the air management system.

Referring now also to FIG. 2B, electrical connections are made between the air management system 12 and the housing 16 for the Zinc-Air cells via the disk shaped members 34a, 34b. Three connections carry power to the contacts 30a, 30b on the cover 30. One connection (not shown) is via a wire from a contact 35a on the carrier 31 in contact with a negative pole of the battery to a shunt or sense resistor (e.g., resistor 64 FIG. 5). Another connection is from the shunt resistor to a negative battery contact 30a on the cover 30. If the cover 30 is provided as a PCB for carrying electronic components, this connection can be on the PCB with a via hole for reaching the rear of the PCB. A third connection is from a contact 35b on the carrier 31 in contact with a positive pole of the battery to the positive contact 30b. This electrical connection is a cable or a wire. Beside the connections for the power, there are also connections for the electronic circuit 40 and the motor 32. These connections are provided by cables, wires or plated conductors and so forth.

The contacts 34a, 34b on the housing 20 are metal disks that attach to the carrier 31. The metal disks 34a, 34b are moved inside a wide portion of a pair of keyholes 39a, 39b on the carrier 31 and pressed against contact springs 37a, 37b. The metal disks are shifted to a narrow portion of the keyholes 39a, 39b. Here, the width of the narrow portion of the keyholes 39a, 39b is smaller than the diameter of the small contact disks 34a, 34b. The narrow region of the keyholes 39a, 39b secure the disk shaped members 34a, 34b into the carrier 31. As also shown, the contact springs 37a, 37b have contacts portions 37a', 37b' on the backside of the carrier for contact to the zinc-air cells. An O-ring 33 is used to secure an air passage between air exit port 33 on the housing 20 and a tube 42 attached to the rear of the carrier 31.

Alternatively, the housing can include two shaped members which press-fit onto stubs (not shown) formed on a carrier to couple to the zinc-air battery cells.

Referring back to FIG. 2A, the impeller assembly 24 (hereinafter also referred to as impeller 24) includes an impeller cover 26 and a lamella wheel 28. The thickness of the impeller cover or the height of the lamella wheel is of the same order of magnitude as an air gap between the impeller cover and the housing 20, which is the origin of volumetric loses for open impellers. The efficiency of the impeller 24 increases significantly if it enclosed on both sides. The motor 32 has a shaft 43 attached to the impeller 24 to drive the impeller 24.

The impeller 24 can have several orientations. In one orientation, the impeller axis is perpendicular to the axis of the battery cells. However, to achieve a useful value of impeller speed at the circumference, the motor speed has to be very high. In an alternative configuration, the impeller axis is identical with the axis of one of the battery cells. This orientation results in an impeller that can be larger than when the impeller axis is perpendicular to the axis of the battery cells. Lower speeds for rotation of the impeller are permitted with this configuration compared to when the axis is perpendicular. This orientation results in an impeller having a lower level of noise, produced by an impeller and a motor running at lower rotational speed. Various types of impellers can be used. The best-adapted type of impeller depends on the values for the air volume to be moved and the air pressure to be generated. Axial impellers are better adapted for high volumes to be moved against a low pressure and radial types are a better choice for small air volumes moved against a high pressure. The region between the two cases is covered by diagonal types of impellers. The names describe the direction, taken by the air when leaving the impeller. Values for features of the impeller can be calculated to determine which type is best adapted. See Table 1.

TABLE 1

Values for choosing the best adapted type of impeller

| | | | |
|---|---|---|---|
| Air volume flow | 2.2E−6 | M$^3$/s | |
| Pressure enhancement | 10 | N/m$^2$ = Pa | |
| Diameter of Impeller | 12E−3 | m | |
| Rotational speed | 100 | 1/s | |
| Specific work on the air | 8 | J/kg | |
| Rotational number σ | 0.066 | | dimensionless key figure, calculated out of the previous magnitudes |
| Diameter number δ | 14.3 | | dimensionless key figure, calculated out of the previous magnitudes |

A Cordier chart can be used to select the correct type of impeller, when key figures are given.

In the state of rest, when the motor 32 is not running, air transport is by diffusion through holes in the cover 30. The air ducts (diffusion tubes 41a, 41b and channel 39) are configured to ensure that diffusion is limited to a relatively low amount of air in rest states. The amount of air is selected to be sufficiently high to enable low current flow from the battery without voltage dip occurring. On the other hand, air flow is also selected to be sufficiently low to limit the ingress of carbon dioxide from the air into the battery. Excess carbon dioxide can cause premature aging of the Zinc-Air cells.

Figure 3:
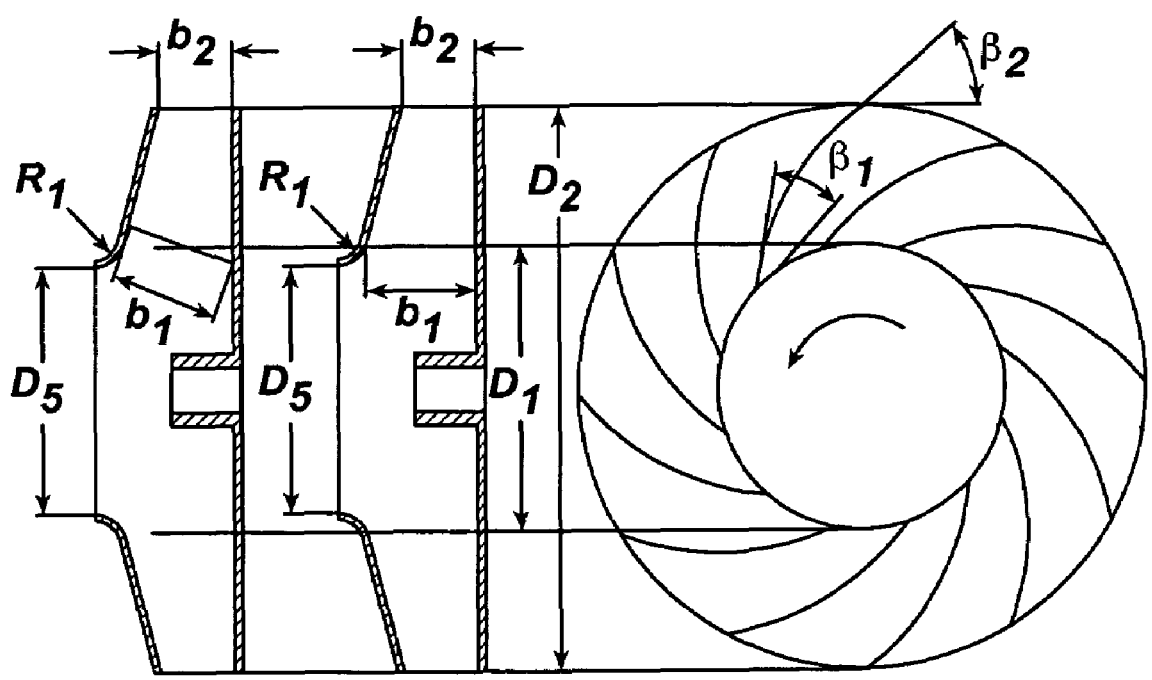
FIG. 3 is a set of side and front views of an impeller assembly.

Referring now to FIG. 3, and Table 2 typical dimensions for a radial impeller used in the air management system 10 are shown as a configuration for a AA sized Zinc-Air battery system. Other configurations and parameters can be used.

| Characteristic | Ref in FIG. | Value | Units | Comment |
|---|---|---|---|---|
| Air volume flow | | 2.2E−6 | m$^3$/s | Input parameter |
| Pressure enhancement | | 10 | N/m$^2$ = Pa | Input parameter |
| Volumetric efficiency | | 0.7 | | Intermediate parameter |
| Inflow figure | | 0.25 | | Intermediate parameter |
| Outer diameter | D2 | 12 | Mm | Input parameter |
| Inflow diameter | Ds, D1 | 2 | Mm | impeller parameter |
| air channel thickness at inner part | B1 | 0.7 | Mm | impeller parameter |
| air channel thickness at circumference | B2 | 0.15 | Mm | impeller parameter |
| Blade inflow angle | β1 | 63 | Degree | impeller parameter |
| Blade exhaust angle | β2 | 73 | Degree | impeller parameter |
| Number of Blades | | 9 | | lowering of value not critical |
| Total efficiency | | 0.5% | | conservatively estimated based on existing fan data |

Figure 4:
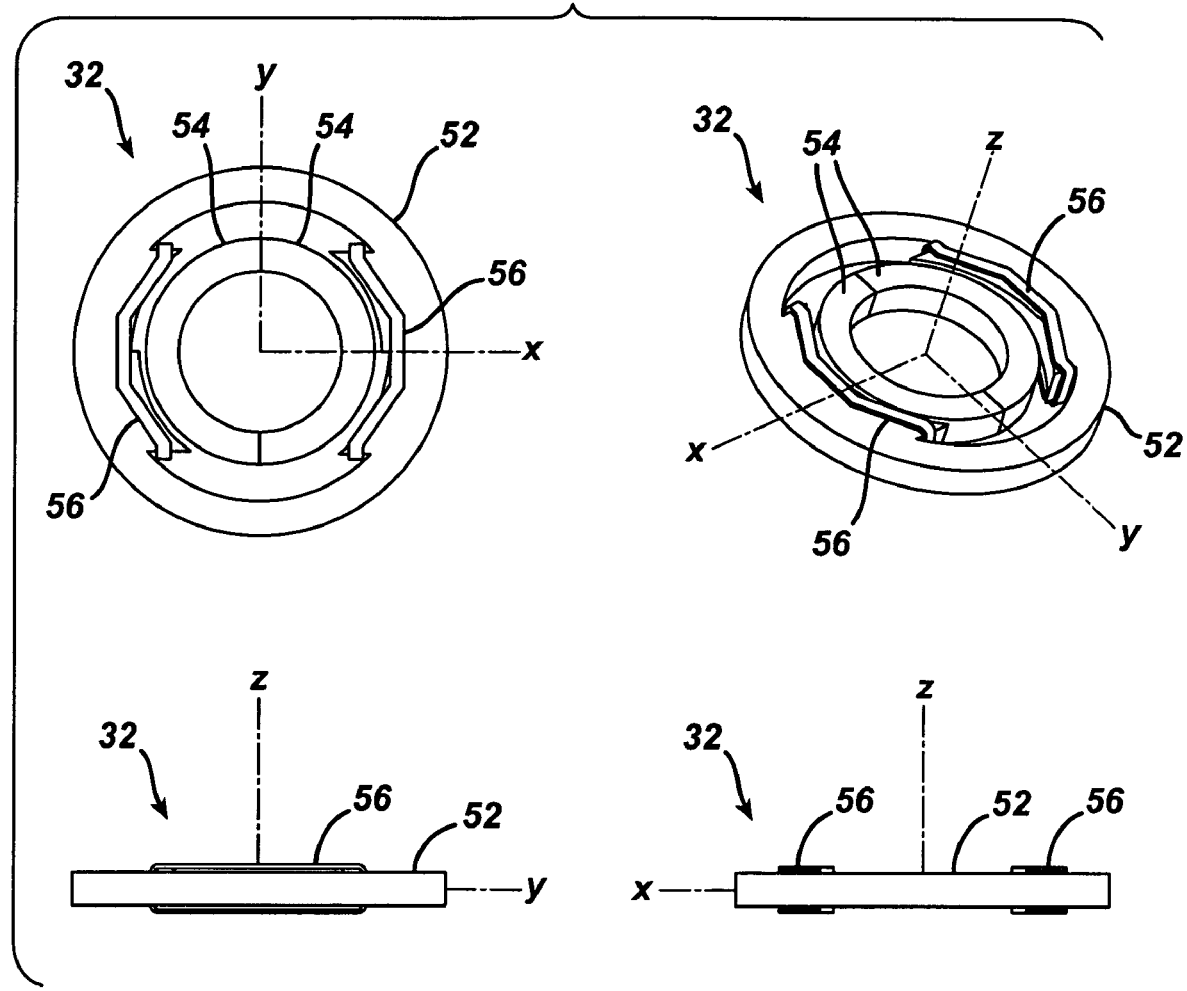
FIG. 4 is a series of diagrammatical views of a motor for the air management system of FIG. 2.

Referring to FIG. 4, the motor 32 is shown for the magnetically relevant parts of the synchronous motor with stator 52, rotor magnet 54 and copper coil 56. The coil 56 is shown disposed about the stator 52. The motor includes a shaft 43 (FIG. 2A) that mounts the transverse-magnetized permanent magnet 54. Together with the shaft the magnet 54 rotates in a magnetic field generated by the coil 56 formed over the stator 52. An asymmetry in the stator 52 can be used to ensure reliable startup of the motor. The motor 32 can be of the brushless type, keeping radiation of electromagnetic interference at a minimum. Additional electromagnetic compatibility provisions thus become unnecessary. Other arrangements are possible. For instance, a larger distance may be provided between the coil and the rest of the motor.

The synchronous motor 32 uses the single copper coil 56 and the rotor magnet 54 turning in the field of the coil 56 to rotate the impeller 24. The synchronous motor 32 shown is similar to a conventional clock motor. The synchronous motor 32 is simple having a single coil 56 without brushes. The synchronous motor 32 uses control electronics 40 (described below) for generating pulses that alternate in polarity at a frequency rate. The pulse frequency rate is ramped up for accelerating the motor in a controlled way. Several basic parameters for the motor can be derived from impeller data and housing configuration and are shown in Table 3.

TABLE 3

Motor parameters for driving a radial impeller

| Characteristic | Value | Units | Comment |
|---|---|---|---|
| Maximum rotational speed | 100 | 1/s | Motor parameter |
| Air volume flow | 2.2E−6 | m$^3$/s | |
| Pressure enhancement | 10 | N/m$^2$ = Pa | |

TABLE 3-continued

Motor parameters for driving a radial impeller

| Characteristic | Value | Units | Comment |
|---|---|---|---|
| Output power of fan in air stream | 20E–6 | W | |
| Required motor output power | 4E–3 | W | motor parameter |
| Sense of rotation | negative, i.e. clockwise | | motor parameter |
| Maximum diameter | 11.5 | mm | motor parameter |
| Maximum length | 2.9 | mm | motor parameter |

For height considerations, in certain applications, it is possible to move the motor coil directly into the motor cavity and to mount the permanent magnet on an axis of the impeller, such that the magnet is disposed with the coil winding. The motor has a defined direction of rotation and an axis, sufficiently long for attaching a small propeller.

The motor 32 can have the coil 56 wound around the stator 52. To avoid any magnetic short circuits, the yoke can be open. In this arrangement, a single coil 56 is placed independent of pole shoes (not numbered) of the magnet 54. This gives geometric flexibility.

Alternatives to the synchronous motor could be used. For instance, a conventional direct current motor (PM DC motor) could be used. Advantages of such a motor include relatively simple control of the motor, a DC voltage is sufficient as a supply and the speed can be adjusted in a limited range by simple pulse width modulation. Disadvantages include the need for brushes in the motor. The brushes of the motor produce electromagnetic distortion, which would be undesirable. While, the electromagnetic distortion could be shielded it would be a source of increase cost and complexity. Also due to the presence of the brushes, the motor length is relatively long. A second alternative is a disk shape DC motor sometime referred to as a spindle motor. This type of DC motor works with a magnetic field in parallel with the motor axis, whereas the conventional DC motor works with a mainly radial magnetic field. Advantages of this arrangement include the advantages of the conventional DC motor, and in addition, the disk shapes DC motor is well adapted for flat motors. The disadvantages include those of the conventional DC motor.

TABLE 4 details of motor parameters.

| | | |
|---|---|---|
| Length of rotor, measured in z (along axis of motor) | 1.1 | Mm |
| Length of stator, measured in z (along axis of motor) | 1.5 | Mm |
| Diameter of the rotor | 4.8 | Mm |
| Wire diameter | 62 | Um |
| Wire Insulation thickness | 5 | Um |
| Number of turns in winding | 1043 | |

Figure 5:
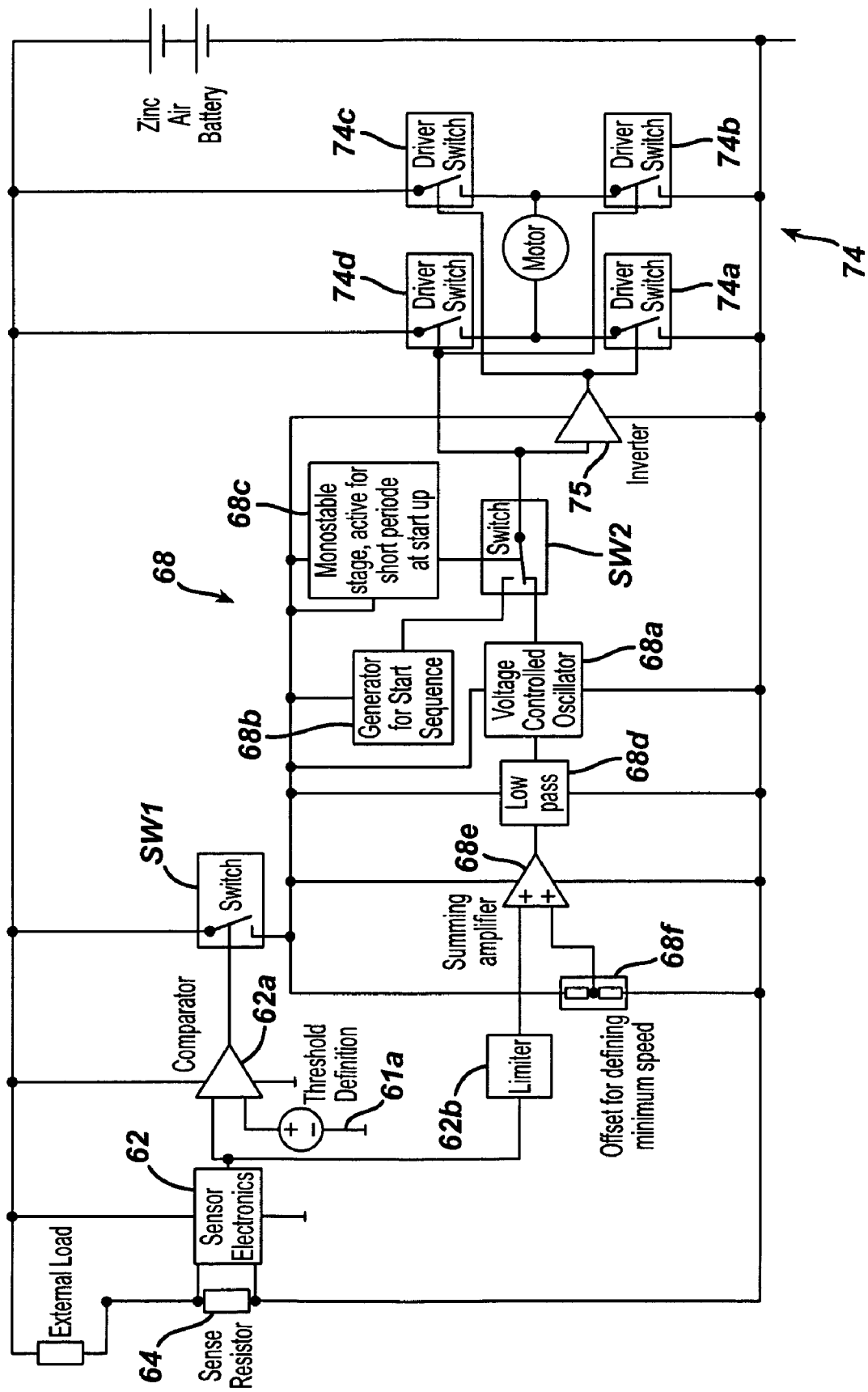
FIG. 5 is a block diagram of a motor control system.

Referring to FIG. 5, the electronic control circuitry 40 for the motor includes a sensor circuit 62 that senses a small voltage drop across a resistor 64 and amplifies the voltage for an input signal for an electronic control 66 that drives the motor 32. The voltage sensor 62 also measures the input voltage. The voltage sensor 62 shuts down the system via a comparator 62a when the input signal falls under a threshold for a defined time set by an empirically determined threshold signal 61a on comparator 62a. The sensor circuit 62 also limits the output signal via a limiter 62b, as soon as a defined maximum voltage is reached. The electronic control 40 includes a processing circuit 68 that produces an output signal to drive the motor 32 which in turn causes rotation of the impeller. As soon as the input signal to the processing circuit is larger than the threshold, the motor is switched to its "on" state. In this case, the voltage sensor 62 outputs a signal that is proportional to the input signal, i.e., up to a maximum value which is the voltage required for full motor speed.

The electronic control 40 receives the input signal from the sensor circuit 62 and feeds the input signal to a switch SW1 that couples voltage from the Zinc-Air Battery to a voltage controlled oscillator 68a, a generator 68b to start a pulse sequence, a monostable stage 68c and low pass filer, 68d, and summing amplifier 68e. A switch SW2 controls whether pulses come from the voltage controlled oscillator 68a, which generally produces the output signal to drive the motor 32 or the generator 68b. The switch SW2 is controlled by the monostable stage 68c. A voltage divider 68f is used to define an offset voltage for the summing amplifier 68e to define minimum speed. The voltage controlled oscillator 68a can include a pulse width modulator for adapting the pulse width from the oscillator to the actual battery supply voltage, and a reset circuit. The reset signals enable the motor 32 to restart in the event that the motor stops unexpectedly. The electronic control circuit also includes a driver 74 that generates output pulse signals, via driver switches 74a-74d and inverter 75, having the required power to drive the motor 32.

According to one technique, the pulses are produced according to timing from a logic generator circuit 68b as soon as the threshold voltage is reached. The first pulse is positive and has a long duration, T1. The first pulse adjusts the rotor of the motor 32 in one of two possible orientations. After the first pulse, a break is generated to give the rotor enough time to finish any oscillations and to settle in position. The length of this break is T2. Subsequently, the sequence for accelerating and constantly turning the motor is generated. The frequency of the pulse train is ramped up with a time constant tau_acc until a minimum motor speed f_min is reached. Lower rotation speeds than the minimum are avoided, because such lower speeds run the risk of driving the motor into internal resonances. The possibility of such internal resonances is also the reason for the well defined time constant tau_acc. The time constant has to be short enough to preclude the motor to have sufficient time to develop oscillations at its resonance frequency. A typical value for the resonance frequency is 30 Hz.

Figure 6:
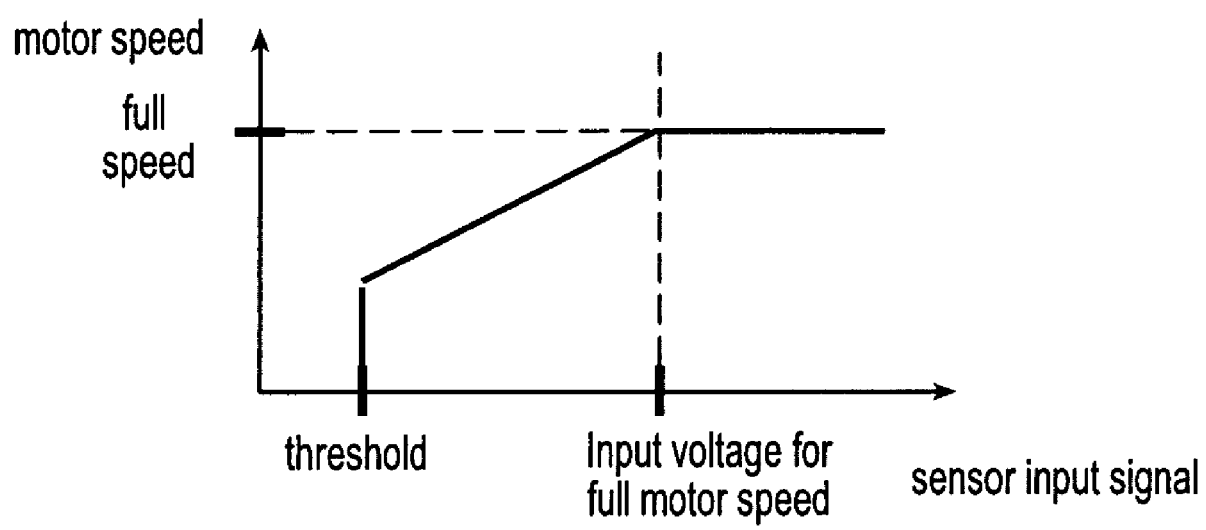
FIG. 6 is a graph depicting a relation between motor speed and sense voltage.

The speed of the motor is adapted to increases in voltage levels of the signal from the voltage sensor (sensor signal). This is done by maintaining a linear relationship between speed, as a function of sensor signal. The relation of speed vs. input voltage of the sensor signal is illustrated in FIG. 6.

In the simplest case, the signal sequence for the motor can be a square-wave alternating voltage. The frequency of this voltage is monotonously dependent on the sensor signal. The result is a motor speed that increases with the measured current flow. As a consequence, the amount of air conveyed to the Zinc-Air cells also increases as necessary for a zinc-air battery to deliver increasing amounts of current. The provision of a low pass filter at an appropriate location in the signal flow, for example, at the output of the sensor block, avoids abrupt frequency variations that the motor would be unable to follow due to its inertia moment.

The duty cycle of the motor voltage can be adjusted to a value appreciably below 100%, provided that, the mean torque of the motor is still sufficient. This results in energy savings. For enhanced reliability, the motor control operates with feedback, by detecting the motor position and making the instantaneous output voltage dependent on the motor position to synchronize the motor control with the motor. One possibility to achieve this in a particularly economical and space-saving manner includes evaluating the voltage induced by the motor. This voltage reaches its extreme values when (as shown in motor theory) the motor is in the positions of its maximum torque. With the motor of FIG. 3, this is the case when it has rotated through +/−90 degrees out of its position shown. The induced voltage is present as soon as the motor rotates. For starting, the motor, the motor is provided with at least one starting pulse as described above. Any further pulses are generated according to the induced voltage.

In the simplest case, the polarity of the motor voltage is equated with the polarity of the induced voltage using a comparator. The induced motor voltage is not identical with the voltage residing at the motor. For its measurement, a variety of possibilities exist. Off-times may be built in the control pulses, as previously mentioned as a means for saving energy. In these off-times, the output of the motor control switches to high impedance. The induced voltage will be present at the beginning of these off-times after a short interval (dependent on the motor inductivity and the impedance of the motor control).

A further technique to measure the induced voltage is to measure the motor voltage under load. This voltage includes the induced voltage and a voltage component provided by a voltage drop across the Ohmic resistance of the motor coil. This component is determined by measuring the current flow through the motor and multiplying it by the (constant) Ohmic resistance of the motor coil. The induced voltage is obtained by calculating the difference.

To prolong the service life of the unused battery, the electronic unit is configured so that in the state of rest, only the sensor 62 is connected to the operating voltage. Only when its output signal exceeds a defined threshold will voltage be supplied to the motor control. To satisfy the demands for space, the electronic unit can be accommodated in an ASIC with a few external components such as the sense resistor.

The air management system makes it possible to operate a zinc-air battery in such a manner as to enable it to exhibit high performance while having a long service life when in an unused condition. With existing batteries, as for hearing aids, the entrance of air is severely limited. In consequence, the output power is relatively low. However, were the entrance holes larger, the maximum power would rise, but battery life would be materially shortened because the entry of carbon dioxide would rapidly destroy the battery due to unwanted secondary reactions. The combination of high battery performance with long service life is accomplished with the air management system 12. The air management system 12 is directly attachable to the battery and can accompany the battery in a battery compartment of an appliance.

A number of embodiments of the invention have been described. Nevertheless, it will be understood that various modifications may be made without departing from the spirit and scope of the invention. For example, other types of motors and housing configurations could be used, such as a housing with only a single cavity. Accordingly, other embodiments are within the scope of the following claims.

What is claimed is:

1. An air management system for a metal-air battery comprises:
    a housing having at least one cavity with a first end and a second end, with the housing having a first surface at the second end of the cavity carrying a pair of external electrical battery contacts to make external contact to metal-air cells and an aperture, the first end of the cavity and the metal-air cells disposed on opposite sides of the first surface, with the housing having a passageway to couple air through the aperture in the first surface into the cavity of the housing to metal-air cells;
    a motor disposed in the at least one cavity of the housing;
    an impeller in communication with the motor, the impeller and motor configured to deliver air from an ingress to the housing to the exit port of the housing; and
    a cover disposed over the housing.

2. The system of claim 1 wherein the housing includes two disk shaped members that couple to a metal-air cell.

3. The system of claim 1 wherein the housing includes two disk shaped members configured to couple to a pair of keyholes on a carrier that is coupled to a metal-air cells.

4. The system of claim 1 wherein the housing has a channel to provide air passage from the cavity and through the housing.

5. The system of claim 1 wherein the impeller assembly includes an impeller cover and a lamella wheel and the impeller, a radial impeller, a mixed mode impeller or a diagonal impeller.

6. The system of claim 1 wherein system is configured to have two battery cells and the impeller axis is identical with the axis of one of a pair of battery cells.

7. The system of claim 1 wherein the cover includes a pair of contacts to make electrical connection with an appliance.

8. The system of claim 1 wherein the motor is a synchronous motor and the system further comprises:
    an electronic circuit to control operation of the synchronous motor, the electronic circuit including a sensor circuit that senses a voltage across a resistor, and amplifies the voltage to provide an input signal for the electronic circuit.

9. The system of claim 8 wherein the electronic circuit further comprises:
    a voltage controlled oscillator that produces an output signal to drive the synchronous motor in response to the input signal from the sense circuit.

10. The system of claim 8 wherein the electronic control circuit further comprises:
    a driver circuit to apply pulses to drive the synchronous motor.

11. The system of claim 8 wherein the electronic control circuit further comprises:
    a circuit to start the synchronous motor.

12. The system of claim 11 further comprising:
    a generator circuit to produce output pulse signals with a first one of the output pulse signals having a duration of a sufficient period to adjust the rotor of the motor in one of two orientations.

13. The system of claim 12 wherein after the first pulse is produced, the generator circuit delays a period of time to give the rotor time to finish any oscillations and to settle in position, and subsequently the driver starts a sequence for accelerating and constantly turning the motor.

14. The system of claim 1, wherein the cover further comprises at least one electrical contact having at least one aperture to facilitate air flow.

15. A metal-air battery comprises:
    a cell housing holding at least one metal-air cell, the cell housing having a pair of opposing ends;
    an interface electrically coupled to the cell housing holding the at least one metal-air cell; and
    an air management system comprising:
        an air management system housing connected to one of the pair of opposing ends of the cell housing, the air management system housing having at least one cavity with a first end and a second end and a passage to allow air flow from the cavity, with the air management system housing carrying external electrical battery that make electrical contact with the interface to deliver power from the cell to the external electrical battery contacts, wherein the first end of the cavity is on an opposite side of the air management system housing that is affixed to the one of the ends of the cell housing;

a motor disposed within the one cavity in the air management system housing;

an impeller in communication with the motor;

an electronic circuit to control the motor; and a cover disposed over one side of the air management system housing; the opposite side of the air management housing that is affixed to the one of the ends of the cell housing holding the at least one metal-air cell.

16. The battery of claim 15 wherein the air management system housing having at least one cavity includes two disk shaped members that couple to the interface.

17. The battery of claim 15 wherein the air management system housing having at least one cavity includes two disk shaped members configured to couple to a pair of keyholes on the interface.

18. The battery of claim 15 wherein the air management system housing having the at least one cavity has a channel to provide an air passage from the cavity.

19. The battery of claim 15 wherein the impeller assembly includes an impeller cover and a lamella wheel and the impeller is a radial impeller, a mixed mode impeller or a diagonal impeller.

20. The battery of claim 19 wherein the battery includes two cells and the impeller axis is identical with the axis of one of the battery cells.

21. The battery of claim 15 wherein the cover includes a pair of contacts to make electrical connection with an appliance.

22. The battery of claim 21 wherein the electronic control circuit further comprises:

a driver circuit to apply pulses to drive the synchronous motor.

23. The battery of claim 21 wherein the electronic circuit further comprises:

a circuit to start the synchronous motor.

24. The battery of claim 23 further comprising:

a generator circuit to produce output pulse signals with a first one of the output pulse signals having a duration of a sufficient period to adjust the rotor of the motor in one of two orientations.

25. The battery of claim 24 wherein after the first pulse is produced, the generator circuit delays a period of time to give the rotor time to finish any oscillations and to settle in position, and subsequently the driver starts a sequence for accelerating and constantly turning the motor.

26. The battery of claim 24 wherein the motor is disposed in one of the cavities in the air management system housing of the air management system and the other cavity holds the electronic circuit to control the motor.

27. The battery of claim 15 wherein the motor is a synchronous motor and the system further comprises:

an electronic circuit to control operation of the synchronous motor, the electronic circuit including a sensor circuit that senses a voltage across a resistor, and amplifies the voltage to provide an input signal for the electronic circuit.

28. The battery of claim 27 wherein the electronic control circuit further comprises:

a voltage controlled oscillator that produces an output signal to drive the synchronous motor in response to the input signal from the sense circuit.

29. The battery of claim 15 wherein the at least one metal-air cell is a zinc-air cell.

30. The battery of claim 15 wherein the at least one metal-air cell is a first one of a pair of zinc-air cells.

31. The battery of claim 30 wherein the air management system housing has the at least one cavity as a first cavity and has a second cavity and the passage to allow air flow is disposed between the first and second cavities.

32. The metal-air battery of claim 15, wherein the cover further comprises at least one electrical contact having at least one aperture to facilitate air flow.

* * * * *